US012547773B2

(12) United States Patent
Hojjati

(10) Patent No.: US 12,547,773 B2
(45) Date of Patent: Feb. 10, 2026

(54) UTILIZING HARDWARE TOKENS IN CONJUNCTION WITH HSM FOR CODE SIGNING

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 232 days.

(21) Appl. No.: 18/100,780

(22) Filed: Jan. 24, 2023

(65) Prior Publication Data

US 2024/0249029 A1 Jul. 25, 2024

(51) Int. Cl.
  *G06F 21/64* (2013.01)
  *G06F 21/31* (2013.01)
  *G06F 21/60* (2013.01)

(52) U.S. Cl.
  CPC .............. *G06F 21/64* (2013.01); *G06F 21/31* (2013.01); *G06F 21/602* (2013.01)

(58) Field of Classification Search
  CPC ......... G06F 21/64; G06F 21/31; G06F 21/602
  See application file for complete search history.

(56) References Cited

U.S. PATENT DOCUMENTS

| | | | | |
|---|---|---|---|---|
| 2008/0163337 | A1* | 7/2008 | Tuliani | H04L 63/123 726/2 |
| 2018/0262341 | A1* | 9/2018 | Cheng | G06F 21/64 |
| 2019/0074982 | A1* | 3/2019 | Hughes | H04L 9/0863 |
| 2022/0417032 | A1* | 12/2022 | Medvinsky | H04L 63/123 |
| 2024/0113898 | A1* | 4/2024 | Er | G06F 21/552 |

* cited by examiner

*Primary Examiner* — Khoi V Le
(74) *Attorney, Agent, or Firm* — Baratta Law PLLC; Lawrence A. Baratta, Jr.

(57) ABSTRACT

Utilizing hardware tokens in conjunction with a Hardware Security Module (HSM) for code signing includes, subsequent to storing a private key of a developer, receiving a request to sign a digest of software from the developer; receiving an approval from the developer to enable use of the private key; and responsive to the approval, encrypting and signing the digest utilizing the private key to attest the software is from the developer. The steps can further include, responsive to failing to receive the approval, denying the request. In this manner, a cloud based HSM approach can be trusted similarly to a physical hardware token approach, as well as providing the additional security benefits of an HSM over a physical hardware token.

16 Claims, 3 Drawing Sheets

UTILIZING HARDWARE TOKENS IN CONJUNCTION WITH HSM FOR CODE SIGNING

FIELD OF THE DISCLOSURE

The present disclosure relates generally to computing and digital trust. More particularly, the present disclosure relates to systems and methods for utilizing hardware tokens in conjunction with a Hardware Security Module (HSM) for code signing.

BACKGROUND OF THE DISCLOSURE

Code signing is the process of applying a digital signature to a software binary or file. Advantageously, this digital signature validates the identity of the software author and/or publisher and verifies that the file has not been altered or tampered with since it was signed. Code signing is an indicator to the software recipient that the code can be trusted, and it plays a pivotal role in combating malicious attempts to compromise systems or data. Use cases for code signing can include, for example, software for internal or external use, patches or fixes, testing, Internet of Things (IOT) device product development, computing environments, and mobile apps. Apart from code and software, code signing also applies to applications, firmware, files, messages, Extensible Markup Language (XML), scripts, containers, images and the like.

On industry standard for code signing is the CA/Browser Forum, "Baseline Requirements for the Issuance and Management of Publicly-Trusted Code Signing Certificates," Version 3.2.0, Oct. 28, 2022, the contents of which are incorporated by reference in their entirety. This comes into effect later in 2023 and will require private keys for standard code signing certificates to be stored on hardware certified as Federal Information Processing Standards (FIPS) 140 Level 2, Common Criteria Evaluation Assurance Level (EAL) 4+, or equivalent. Advantageously, this change strengthens private key protection for code signing certificates and aligns it with EV (Extended Validation) code signing certificate private key protection. To meet these storage requirement, some example techniques include:

(1) Use of an HSM, verified by means of a manufacturer's certificate. An HSM is a physical computing device that safeguards and manages secrets (most importantly digital keys), performs encryption and decryption functions for digital signatures, strong authentication and other cryptographic functions.

(2) A cloud-based key generation and protection solution with the following requirements: (a) Key creation, storage, and usage of Private Key must remain within the security boundaries of the cloud solution's Hardware Crypto Module that conforms to the specified requirements, and (b) Subscription at the level that manages the Private Key must be configured to log all access, operations, and configuration changes on the resources securing the Private Key.

(3) A Hardware Crypto Module provided by the Certificate Authority (CA).

(4) Contractual terms in the Subscriber Agreement requiring the Subscriber to protect the Private Key to a standard of at least FIPS 140-2 level 2 or Common Criteria EAL 4+ and with compliance being confirmed by means of an audit.

For all of these storage requirements above, the upcoming changes in the code signing standard will push organizations to utilize different hardware as the primary location for storing the private keys used to sign software. That is, the location of the private keys for signing software will change, e.g., from a local device such as a Universal Serial Bus (USB) token (e.g., a YubiKey) to something outside of the developer's physical control. Our research shows that the new standard will have direct psychological impact on developers where they do consider that they are not in charge of their own private keys and they fear that one way or other the entity in charge of hosting the HSM on the cloud will use their private key without their consent. That is, there are two general issues with the change in physical location of the private keys, namely (1) how to ensure only the developer is using the key and not the host for other purposes whether benign or malicious, and (2) how to overcome the physiological aspect of moving the key from a local device (e.g., USB key) to the cloud where physical possession is meaningless.

BRIEF SUMMARY OF THE DISCLOSURE

The present disclosure relates to systems and methods for utilizing hardware tokens in conjunction with a Hardware Security Module (HSM) for code signing. The present disclosures seeks to enable developers to still utilize their hardware token (physically being held by the user) to enable access to the HSM hosted by an entity. The approach is to have the HSM host the private key but have the token held by the user (developer, org, or entity) to enable the utilization of that private key for any signing request. Such approach could be achieved via utilizing a One-Time Password (OTP) or secondary nuance generated by the hardware token (e.g., USB key). Advantageously, this approach has the increased security while removing any concerns related to physical storage of the private key.

The present disclosure includes a method having steps, a system with circuitry and/or processors configured to implement the steps, and/or a non-transitory computer-readable medium storing instructions executable by one or more processors to implement the steps. In an embodiment, the steps include, subsequent to storing a private key of a developer, receiving a request to sign a digest of software from the developer; receiving an approval from the developer to enable use of the private key; and, responsive to the approval, encrypting and signing the digest utilizing the private key to attest the software is from the developer. The steps can further include, responsive to failing to receive the approval, denying the request.

The private key can be stored in a cloud system, and wherein the approval can be from a hardware token physically held by the developer. The cloud system can include one or more Hardware Security Modules (HSMs) being managed by an entity separate from the developer. The hardware token can provide one or more of a one-time password (OTP) for the approval and a secondary nuance for the approval. The secondary nuance for the approval can include any of a time sensitive passcode and a push notification to a pre-enrolled application. The private key can be associated with a code signing certificate for the developer and from a Certificate Authority. The software can include any of software applications made available for download from websites, internal Information Technology (IT) applications, mobile applications, Extensible Markup Language (XML) files, scripts, software Images, containers, drivers and utilities, and firmware. The steps can be implemented by a cloud system with one or more Hardware Security Modules (HSMs) being managed by an entity separate from the developer.

In another embodiment, the steps include, subsequent to storing a private key of a developer, receiving a request to sign a digest of software from the developer; subsequent to the request, one or more of waiting for an approval from the developer to enable use of the private key and providing a notification to the developer for the approval; and, subsequent to receiving the approval from the developer to enable use of the private key, encrypting and signing the digest utilizing the private key to attest the software is from the developer.

In a further embodiment, a Hardware Security Module (HSM) system includes one or more HSM modules, each including circuitry configured to, subsequent to storage of a private key of a developer, receive a request to sign a digest of software from the developer; receive an approval from the developer to enable use of the private key; and, responsive to the approval, encrypt and sign the digest utilizing the private key to attest the software is from the developer. The circuitry can be further configured to, responsive to failing to receive the approval, deny the request.

The HSM system can be a cloud system, and wherein the approval is from a hardware token physically held by the developer. The cloud system can include one or more Hardware Security Modules (HSMs) being managed by an entity separate from the developer. The hardware token can provide any of a one-time password (OTP) for the approval and a secondary nuance for the approval. The secondary nuance for the approval can include any of a time sensitive passcode and a push notification to a pre-enrolled application. The private key can be associated with a code signing certificate for the developer and from a Certificate Authority. The software can include any of software applications made available for download from websites, internal Information Technology (IT) applications, mobile applications, Extensible Markup Language (XML) files, scripts, software images, containers, drivers and utilities, and firmware.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for utilizing hardware tokens in conjunction with a Hardware Security Module (HSM) for code signing. The present disclosures seeks to enable developers to still utilize their hardware token (physically being held by the user) to enable access to the HSM hosted by an entity. The approach is to have the HSM host the private key but have the token held by the user (developer, org, or entity) to enable the utilization of that private key for any signing request. Such approach could be achieved via utilizing a One-Time Password (OTP) or secondary nuance generated by the hardware token (e.g., USB key). Advantageously, this approach has the increased security while removing any concerns related to physical storage of the private key.

Code Signing

Figure 1:
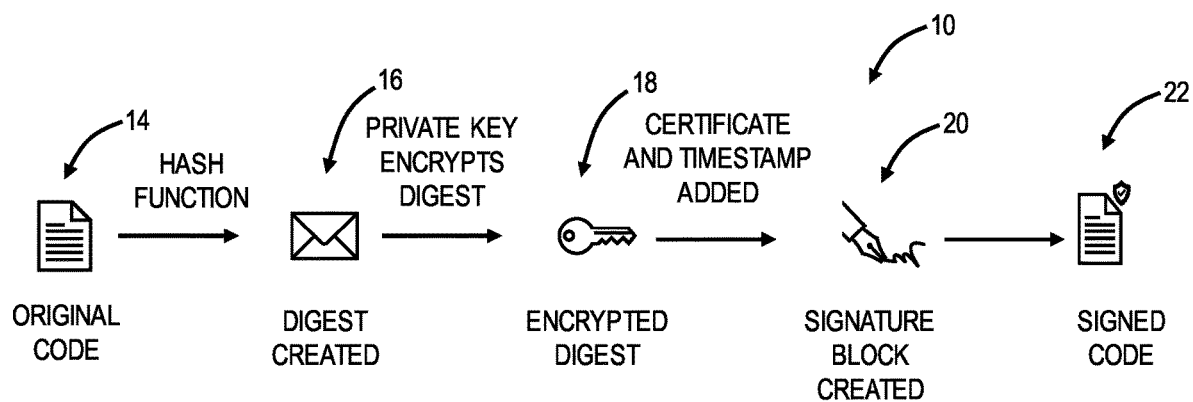
FIG. 1 is a flow diagram of a code signing process.
Figure 2:
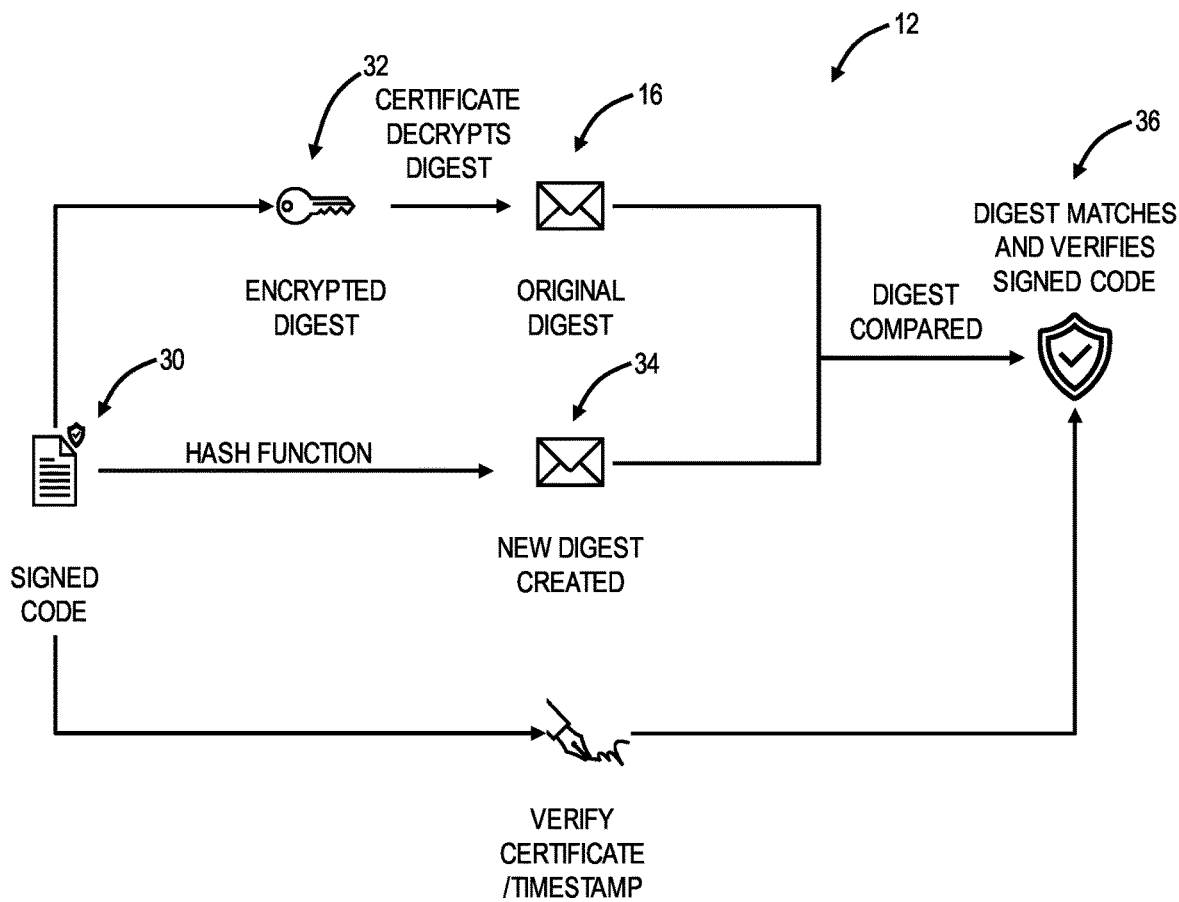
FIG. 2 is a flow diagram of a code verification process.

FIG. 1 is a flow diagram of a code signing process 10. FIG. 2 is a flow diagram of a code verification process 12. As with other Public Key Infrastructure (PKI) technologies, code signing involves a public/private key pair, a Certificate Authority (CA), and a digital certificate. When a publisher signs software, they create a bounded package that includes the publisher's software, a code signing certificate, and a digital signature. The code signing certificate contains the identity and public key of the publisher as well as the CA's signature confirming that the CA has verified the identity. The digital signature is the signed hash of the software using the publisher's private key. In FIG. 1, a hash function is applied to code 14 to create a digest 16 which is encrypted via a private key to provide an encrypted digest 18. A certificate and/or timestamp can be added to recite a signature block 20 for signed code 22.

When the software is delivered, as signed code 30, a user agent can check the certificate for validity and integrity (determining whether the software has been altered since signing). It uses the public key 32 in the certificate to reveal the hash (digest 16) in the digital signature. It then compares the hash a the recently calculated hash 34 from the user agent. If the hashes match 36, the customer or user is assured that the software has not been tampered with. Also, the user agent can verify a certificate and/or timestamp 38 to determine the match 36. The user agent can be software that on a user's machine configured to check the for validity and integrity of the software before execution.

Code signing is required by major software platforms, e.g., Java and Microsoft, to prevent malware propagation. It is also security best practice to sign code so that customers or users do not download tampered code or code from unknown sources. It distinguishes code or software from a given organization versus code that may be packaged to look like it originated from the given organization. Furthermore, when the software is made publicly available, users may encounter security warning labels when the software is not signed. When code is built and developed for internal use, code signing facilitates accountability and control. Any type of binary or file can be signed, including software applications made available for download from websites, internal Information Technology (IT) applications, mobile applications, XML files, scripts, software images, containers, drivers and utilities, firmware, and the like.

For the code signing process 10, a software publisher generates a public/private key pair. Then they obtain a code signing certificate by submitting a Certificate Signing Request (CSR) along with their public key to a Certificate Authority (CA). The CA verifies the identity of the publisher and authenticates the certificate request. If successful, the CA issues the code signing certificate. The code signing certificate includes the identity of the publisher, the public key, and the signature of the CA. The signature of the CA is important, as it acts as a trusted third-party testimonial to the identity of the certificate bearer. The code signing certificate confirms not only the identity of the publisher, but also the integrity of the software. When the publisher signs software, in the code signing process 10, they create a bounded package that includes the software, the code signing certificate and a digital signature. The digital signature is a mathematical scheme for verifying the authenticity of the software. A valid digital signature, where the prerequisites are satisfied, gives a recipient very high confidence that the message was created by a known sender (authenticity), and that the message was not altered in transit (integrity).

The digital signature also requires the following steps:
(1) Generate a hash or cryptographically unique representation of the software with a hashing algorithm.
(2) Sign the hash with the publisher's private key and a signing algorithm.

Code signing can be performed manually or automated as part of a software development lifecycle such as a Continuous Integration/Continuous Delivery (CI/CD) process.

Code Signing Certificates

Code signing certificates are generally used by software engineers or developers to digitally sign applications, drivers, software and other executables. They provide a way for end-users to verify that the code being issued has not been altered or compromised by a third party. Code signing certificates can include a signature, a company's name and, if desired, a timestamp. The benefits of code signing certificates are:
(1) Protection of intellectual property.
(2) Prevention of security warning labels on programs.
(3) Efficient monitoring of code changes.
(4) Contractual obligations.

Code signing is a form of PKI, used in both development and production environments. Again, PKI stands for "Public Key Infrastructure." It is a security framework that facilitates the safe exchange of information using the principles of encryption, authentication, and integrity. The framework involves cryptographic keys (public-private key pairs), digital certificates and a third-party identity verifier, known as a Certificate Authority (CA). The keys secure data by working in tandem. The public key is used to encrypt the data, and the data can only be decrypted by the private key that matches with the public key. PKI has been trusted for decades to secure everything from networks and websites to email and users.

Code Signing Best Practices

Code signing verifies the identity of the software developer or publisher and confirms that the integrity of the code is intact from the time the code was signed to the time the code was downloaded. This proves the code can be trusted. Unfortunately, bad actors are constantly attempting to penetrate code signing practices to embed malware into the trusted code.

Here are some best practices to mitigate the risks of successful attacks:

Secure key storage: If the private key for signing is compromised or stolen from an organization, it can be used to sign software embedded with malware, so the released software registers as legitimate software originating from that organization. Private keys should be secured in a Hardware Secure Module (HSM) or encrypted at rest. According to CA/Browser (CA/B) Forum requirements, keys for public trust usage must be stored in an HSM.

Enforce key and signing access controls: Set up policies and enforce key access controls to ensure only developers and users who are authorized can sign with specific keys, when needed. Generate keys in the cloud so that they do not get shared, lost, or stolen. Enforce separation of duties, i.e., separate the responsibilities of those who generate keys from those who sign. Implement Multi-factor Authentication (MFA) to ensure the person accessing signings is indeed who they say they are. Revoke access from personnel who have left or no longer require access to signings or key generation.

Monitor and audit key signing workflows: Track who signed what when, so you can respond quickly to unauthorized signings and take appropriate remediation action. Regularly audit all activities associated with key pairs, including generation, certificate operations, and assignment of key and signing access.

Stay current and enforce company-wide policies on cryptographic standards: Industry requirements can change to help organizations stay ahead of the threat landscape. New CA/Browser Forum requirements prescribe 3072-bit RSA as the minimum key requirements for publicly trusted code signing and time-stamping certificates Developers and users within an organization may or may not be aware of the changes as they generate keys or sign code. Organizations must enforce industry requirements to prevent users from generating keys or requesting certificates with weak or non-compliant algorithms, key size or curves.

Enable automated code signing in Software Development Lifecycle (SDLC) processes: Integrate and automate signings in SDLC process such as CI/CD pipelines so you can reduce the risks of unsigned code or non-compliant signings. You can set up security controls along with automation to build secure and compliant software at the continuous and rapid pace of software development.

Compare signings from different build servers: Recent software supply chain attacks have caused major operational and financial disruptions in high-impact organizations around the world. Bad actors infiltrate the development operations at a target organization and embed malware into code during SDLC, and this tampered code was later released and deployed in customer systems. Sign and compare the hash of the software from different build servers before release to find out if there are any discrepancies between the server builds. A quorum of two or more identical builds can provide assurance that the builds are secure and that no unknown code has been included in the build.

Revoke compromised certificates: If you discover compromised keys or signed malware, report the event to your CA. The code signing certificate will need to be revoked which will render the software invalid and stop the further propagation of malware.

Timestamp your signed code: Avoid the risks of software expiring unexpectedly when the code signing certificate expires. Code signing certificates are valid for 1-3 years. When a code signing certificate expires, the validity of the software that was signed will also expire unless the software was timestamped when it was signed. The system will record the timestamp and the software will continue to be valid as long as it is in production. Another reason to timestamp your code is to minimize the impact of a certificate revocation. If malware was discovered and the associated certificate must be revoked, timestamping will minimize the impact, as the revocation will only affect software released after the date of compromise.

Private Key Management

Private key management is a critical security element in code signing. If the key is stolen or mismanaged, cybercriminals can use the key to sign malicious code and deliver it as updates to developer or customer systems. There are various approaches to private key storage including, e.g., hardware tokens, HSMs, and the like Typically, private keys for code signing have been stored in hardware tokens. A hardware token is a physical device that is in the possession of the developer. The physical device can be a small device, typically in the general form factor of a credit card or keychain fob. The simplest hardware tokens look identical to a USB flash drive and contain a small amount of storage holding a certificate or unique identifier and are often called dongles. One example of a hardware token is a YubiKey.

Developers generally liked the approach with a hardware token. The private key remains in their possession meaning they can physically hold the private key and know that that private key is only being used by them. Again, the CA/Browser Forum is changing the standards and requirements for the code signing certificate process. The following describes the changes from the CA/Browser Forum.

Private key storage and certificate installation. This new requirement means Certificate Authorities (CAs) can no longer support browser-based key generation and certificate installation or any other process that includes creating a CSR (Certificate Signing Request) and installing your certificate on a laptop or server. Private keys and certificates must be stored and installed on tokens or HSMs certified as at least FIPS 140-2 Level 2 or Common Criteria EAL 4+.

Signing code: To use a token-based code signing certificate, you need access to the token or HSM and the credentials to use the certificate stored on it. For example, you must plug the token into your computer for token-based code signing. Then you need the password to sign your code with the code signing certificate on the token.

It is expected this change will generally include movement of the storage of private keys from hardware tokens to remote, cloud based HSMs. The cloud based HSMs can be hosted by a CA.

Cloud Based HSM

It is possible for developers to deploy and manage their own HSMs for storing the private keys and performing code signing. However, this requires investment and ongoing management. As such, it is expected that developers will use cloud based HSMs that are managed by a cloud provider, CA, etc. This can be views as HSM-as-a-Service and allows developers to host encryption keys and perform cryptographic operations in a cluster of FIPS 140-2 Level 3 certified HSMs.

Code Signing Process Utilizing Hardware Tokens in Conjunction with an HSM

Figure 3:
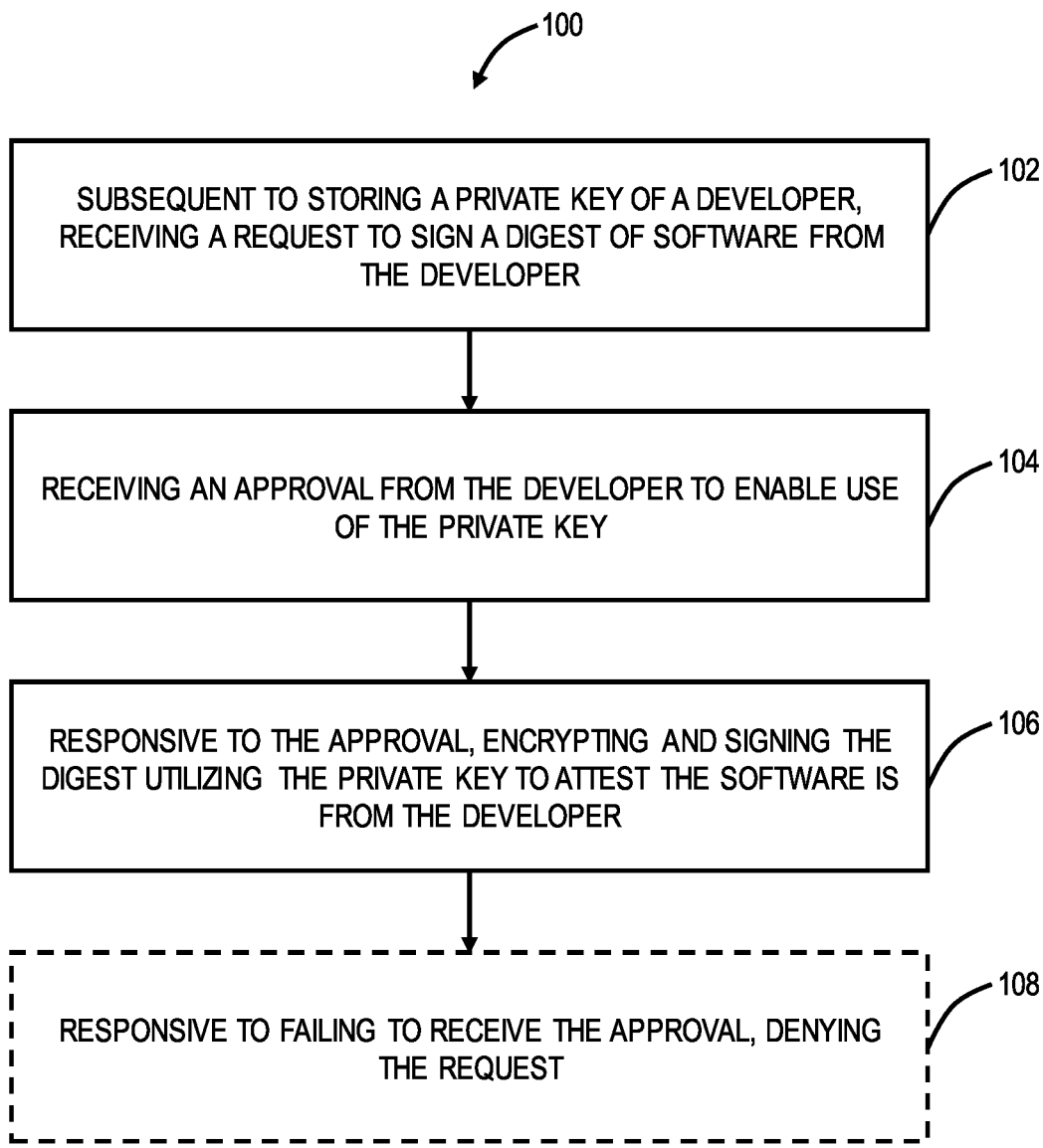
FIG. 3 is a flowchart of a code signing process utilizing hardware tokens in conjunction with an HSM.

FIG. 3 is a flowchart of a code signing process 100 utilizing hardware tokens in conjunction with an HSM. The code signing process 100 can be realized as a method having steps, via a processing device, such as described in FIG. 4, where the processing device is configured to implement the steps, via circuitry configured to implement the steps, and as Instructions, stored in a non-transitory computer-readable medium, where the instructions are executable by one or more processors to implement the steps.

The code signing process 100 includes, subsequent to storing a private key of a developer, receiving a request to sign a digest of software from the developer (step 102); receiving an approval from the developer to enable use of the private key (step 104); and, responsive to the approval, encrypting and signing the digest utilizing the private key to attest the software is from the developer (step 106). The process 100 can further include, responsive to failing to receive the approval, denying the request (step 108).

The private key can be stored in a cloud system, and wherein the approval can be from a hardware token physically held by the developer. In this manner, the code signing process 100 has the benefits of the superior security of HSMs relative to hardware tokens, as well as compliance to standards. The code signing process 100 also gives the developer the piece of mind in that, even though the private key is not physically in possession of the developer, the private key can only be used based on the approval of the developer. The cloud system can include one or more Hardware Security Modules (HSMs) being managed by an entity separate from the developer.

For the approval, the hardware token can provide a one-time password (OTP) for the approval and/or a secondary nuance for the approval. The secondary nuance for the approval can include any of a time sensitive passcode and a push notification to a pre-enrolled application. For example, the developer can have an authentication application (e.g., Google, Microsoft, Okta, etc.) that is pre-enrolled for approvals.

The private key is associated with a code signing certificate for the developer and from a Certificate Authority. The software can include any of software applications made available for download from websites, internal Information Technology (IT) applications, mobile applications, Extensible Markup Language (XML) files, scripts, software images, containers, drivers and utilities, and firmware. The code signing process 100 can be implemented by a cloud system with one or more Hardware Security Modules (HSMs) being managed by an entity separate from the developer.

In another embodiment, an HSM system includes one or more HSM modules, each including circuitry configured to, subsequent to storage of a private key of a developer, receive a request to sign a digest of software from the developer; receive an approval from the developer to enable use of the private key; and, responsive to the approval, encrypt and sign the digest utilizing the private key to attest the software is from the developer.

In another embodiment, a process includes, subsequent to storing a private key of a developer, receiving a request to sign a digest of software from the developer; subsequent to the request, one or more of waiting for an approval from the developer to enable use of the private key and providing a notification to the developer for the approval; and, subsequent to receiving the approval from the developer to enable use of the private key, encrypting and signing the digest utilizing the private key to attest the software is from the developer.

Processing System

Figure 4:
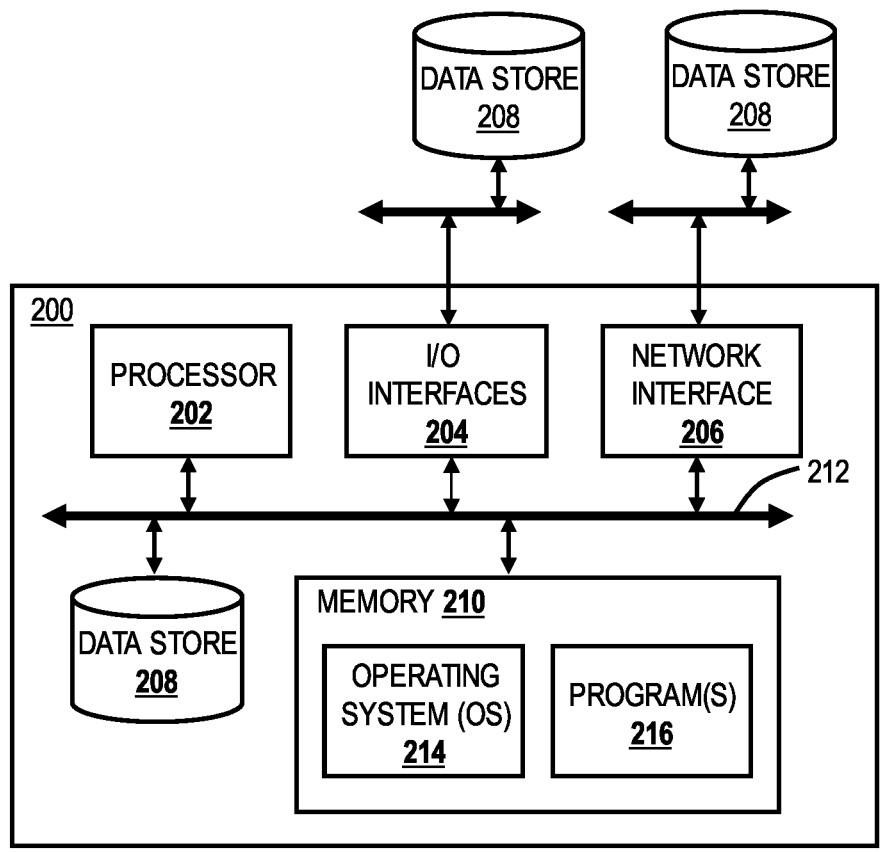
FIG. 4 is a block diagram of a processing system, which may be used to implement the code signing process of FIG. 3.

FIG. 4 is a block diagram of a processing system 200, which may be used to implement the code signing process 100. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing system 200, a semiconductor-based microprocessor (in the form of a microchip or chipset), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components.

The network interface 206 may be used to enable the processing system 200 to communicate on a network, such as the Internet. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing system 200, such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an embodiment, one or more processing systems 200 can be configured in a cluster and/or in a cloud system, for implementing the process 100. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

In an embodiment, the processing system 200 can be an HSM. The HSM is physical computing device that safeguards and manages secrets (most importantly digital keys), performs encryption and decryption functions for digital signatures, strong authentication, and other cryptographic functions. The functions of an HSM are:

- onboard secure cryptographic key generation,
- onboard secure cryptographic key storage, at least for the top level and most sensitive keys, which are often called master keys, key management,
- use of cryptographic and sensitive data material, for example, performing decryption or digital signature functions, and
- offloading application servers for complete asymmetric and symmetric cryptography.

From a physical perspective, the HSM is a hardened, tamper-resistant hardware device.

The present disclosure includes an additional aspect where the private key is usable only after an approval is given, such as from a hardware token. To further secure the private key, the HSM can be configured to lock down, delete, etc. the private key responsive to invalid access attempts.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
   subsequent to storing a private key of a developer in a Hardware Security Module (HSM) hosted separately from the developer, receiving a request to sign a digest of software from the developer;
   receiving, by manual actuation of a hardware token physically located with the developer, an approval from the developer to enable use of the private key, wherein the private key in the HSM is only usable subsequent to the approval, and wherein the approval comprises:
   requiring a secondary nuance which is separate from the HSM and the hardware token, wherein the secondary nuance for the approval includes any of a time sensitive passcode and a push notification to a pre-enrolled application;
   allowing access, based on both the hardware token and the secondary nuance, to the private key in the HSM; and
   responsive to the approval, encrypting and signing the digest utilizing the private key to attest the software is from the developer.

2. The method of claim 1, wherein the steps further include:
   responsive to failing to receive the approval, denying the request.

3. The method of claim 1, wherein the HSM is a physically safeguarded, hardened, and tamper-resistant computing device hosted by an entity separate from the developer.

4. The method of claim 1, wherein the hardware token is a Universal Serial Bus (USB) token.

5. The method of claim 1, wherein the hardware token provides a one-time password (OTP) for the approval.

6. The method of claim 1, wherein the private key is associated with a code signing certificate for the developer and from a Certificate Authority.

7. The method of claim 1, wherein the software includes any of software applications made available for download from websites, internal Information Technology (IT) applications, mobile applications, Extensible Markup Language (XML) files, scripts, software images, containers, drivers and utilities, and firmware.

8. The method of claim 1, wherein the method is implemented by a cloud system with the HSM being managed by an entity separate from the developer.

9. A Hardware Security Module (HSM) system comprising:
   one or more HSM modules, each including circuitry configured to:
   subsequent to storage of a private key of a developer in an HSM which is separate from the developer, receive a request to sign a digest of software from the developer;
   receive, by manual actuation of a hardware token physically located with the developer, an approval from the developer to enable use of the private key, wherein the private key in the HSM is only usable subsequent to the approval, and wherein the approval comprises:
   requires a second nuance which is separate from the HSM and the hardware token, wherein the secondary nuance for the approval includes any of a time sensitive passcode and a push notification to a pre-enrolled application;
   allows access, based on both the hardware token and the secondary nuance, to the private key in the HSM; and
   responsive to the approval, encrypt and sign the digest utilizing the private key to attest the software is from the developer.

10. The HSM system of claim 9, wherein the circuitry is further configured to:
    responsive to failing to receive the approval, deny the request.

11. The HSM system of claim 9, wherein the HSM is a physically safeguarded, hardened, and tamper-resistant computing device hosted by an entity separate from the developer.

12. The HSM system of claim 9, wherein the hardware token is a Universal Serial Bus (USB) token.

13. The HSM system of claim 9, wherein the hardware token provides a one-time password (OTP) for the approval.

14. The HSM system of claim 9, wherein the private key is associated with a code signing certificate for the developer and from a Certificate Authority.

15. The HSM system of claim 9, wherein the software includes any of software applications made available for download from websites, internal Information Technology (IT) applications, mobile applications, Extensible Markup Language (XML) files, scripts, software images, containers, drivers and utilities, and firmware.

16. A non-transitory computer-readable medium comprising instructions that, when executed, cause one or more processors in a Hardware Security Module (HSM) to perform steps of:
    subsequent to storing a private key of a developer in the HSM which is hosted separately from the developer, receiving a request to sign a digest of software from the developer;
    subsequent to the request, one or more of waiting for an approval from the developer by manual actuation of a hardware token physically located with the developer, to enable use of the private key and providing a notification to the developer for the approval, wherein the private key in the HSM is only usable subsequent to the approval, and wherein the approval comprises:

requiring a secondary nuance which is separate from the HSM and the hardware token, wherein the secondary nuance for the approval includes any of a time sensitive passcode and a push notification to a pre-enrolled application;

allowing access, based on both the hardware token and the secondary nuance, to the private key in the HSM; and subsequent to receiving the approval from the developer to enable use of the private key, encrypting and signing the digest utilizing the private key to attest the software is from the developer.

\* \* \* \* \*